United States Patent
Santi et al.

(10) Patent No.: US 9,327,671 B2
(45) Date of Patent: May 3, 2016

(54) VEHICLE SEAT WITH AIRBAG MODULE

(71) Applicant: LEAR CORPORATION, Southfield, MI (US)

(72) Inventors: Luca Santi, Muggio (IT); Armando Pirri, Desio (IT)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 14/307,923

(22) Filed: Jun. 18, 2014

(65) Prior Publication Data
US 2015/0367805 A1 Dec. 24, 2015

(51) Int. Cl.
| | |
|---|---|
| *B60R 21/207* | (2006.01) |
| *B60R 21/2165* | (2011.01) |
| *B60N 2/42* | (2006.01) |
| *B60R 21/231* | (2011.01) |
| *B60R 21/215* | (2011.01) |

(52) U.S. Cl.
CPC .............. *B60R 21/2165* (2013.01); *B60N 2/42* (2013.01); *B60R 21/207* (2013.01); *B60R 21/23138* (2013.01); *B60R 2021/21537* (2013.01); *B60R 2021/23146* (2013.01)

(58) Field of Classification Search
CPC .................. B60R 21/207; B60R 2021/21537; B60N 2/42
See application file for complete search history.

(56) References Cited

U.S. PATENT DOCUMENTS

| | | | |
|---|---|---|---|
| 4,842,329 A * | 6/1989 | Owens ............................. | 297/3 |
| 5,967,614 A * | 10/1999 | Schmidt .................. | 297/452.58 |
| 6,045,151 A | 4/2000 | Wu | |
| 6,632,756 B1 * | 10/2003 | Waldrop et al. ............... | 442/314 |
| 6,688,640 B1 | 2/2004 | Davis, Jr. et al. | |
| 7,540,529 B2 * | 6/2009 | Tracht et al. ............... | 280/730.2 |
| 2007/0057493 A1 | 3/2007 | Ritzel et al. | |
| 2007/0222190 A1* | 9/2007 | Tracht ........................ | 280/730.2 |
| 2008/0061539 A1 * | 3/2008 | Paruszkiewicz et al. .. | 280/730.2 |
| 2010/0078919 A1* | 4/2010 | Naruse et al. .............. | 280/728.2 |
| 2013/0119646 A1* | 5/2013 | Tracht ........................ | 280/730.1 |
| 2013/0187416 A1* | 7/2013 | Nakata ..................... | 297/216.13 |
| 2013/0257120 A1* | 10/2013 | Tracht et al. ............. | 297/216.13 |

\* cited by examiner

*Primary Examiner* — James English
(74) *Attorney, Agent, or Firm* — Brooks Kushman P.C.

(57) ABSTRACT

A vehicle seat according the disclosure includes a support structure, an airbag module attached to the support structure and including a deployable airbag, and a cover assembly positioned over the airbag module and attached to the support structure. The cover assembly includes a cover portion that covers the airbag module, and a support being made separately from the cover portion and being attached to the cover portion and the support structure. The support is configured to facilitate movement of the cover portion with respect to the support structure during deployment of the airbag.

20 Claims, 4 Drawing Sheets

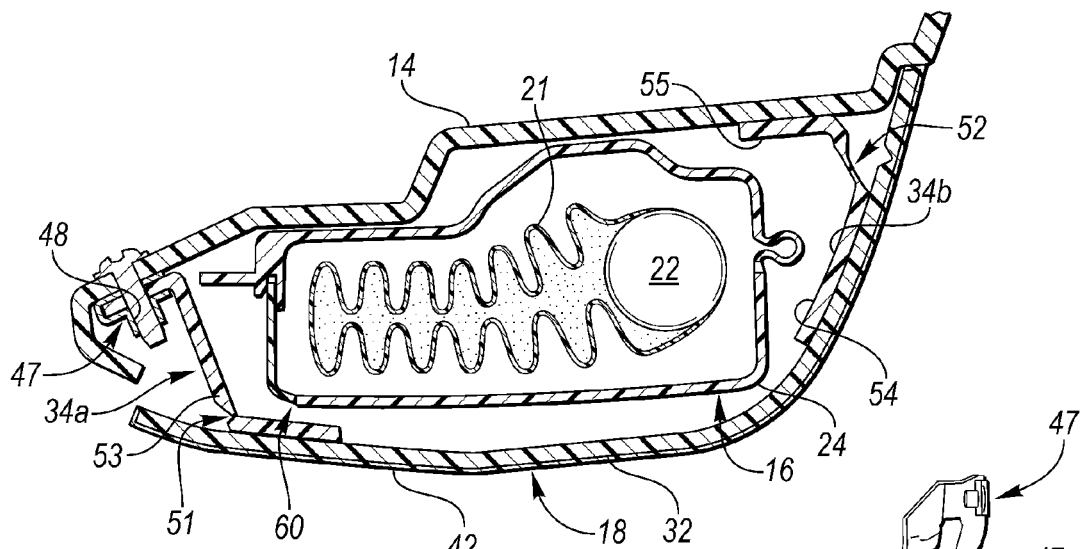
FIG. 2
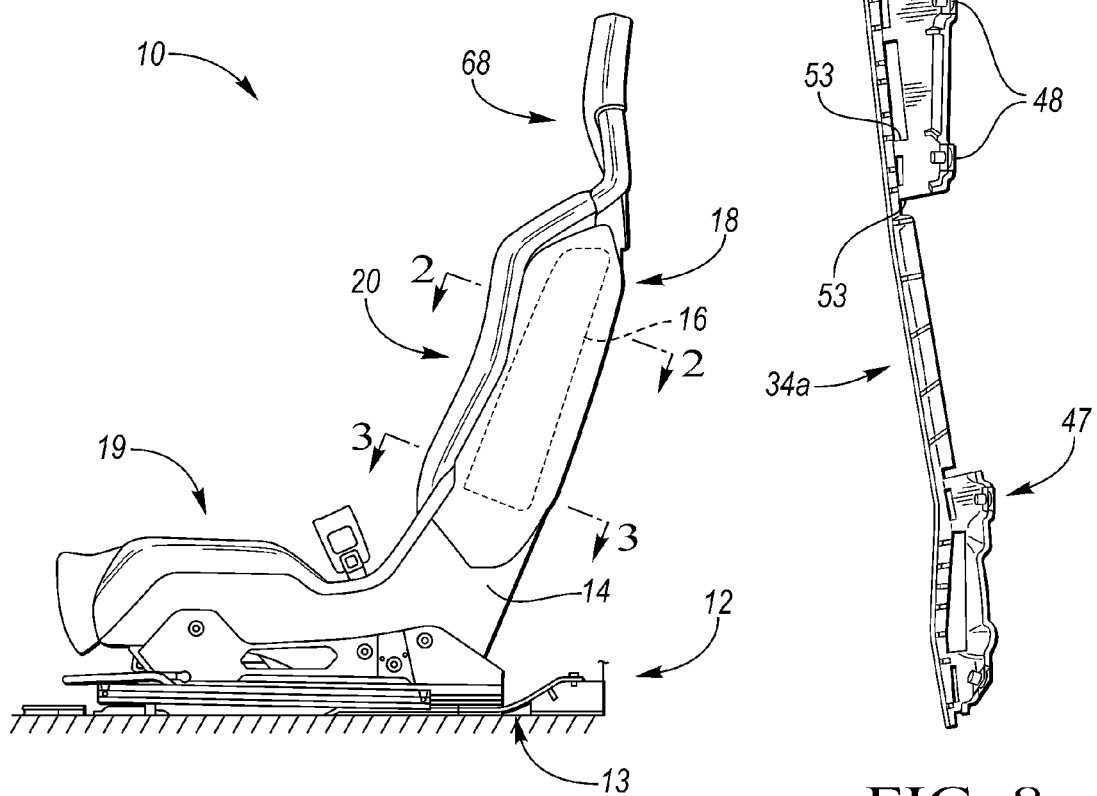
FIG. 1
FIG. 8

US 9,327,671 B2

VEHICLE SEAT WITH AIRBAG MODULE

TECHNICAL FIELD

The present disclosure relates to a vehicle seat including an airbag module having an inflatable airbag.

BACKGROUND

A vehicle seat may be provided with an inflatable airbag. An example of such a seat is disclosed in U.S. Pat. No. 6,045,151.

SUMMARY

A vehicle seat according to one embodiment of the disclosure includes a support structure, an airbag module attached to the support structure and including a deployable airbag, and a cover assembly positioned over the airbag module and attached to the support structure. The cover assembly includes a cover portion that covers the airbag module, and a support made separately from the cover portion and being attached to the cover portion and the support structure. The support is configured to facilitate movement of the cover portion with respect to the support structure during deployment of the airbag.

While exemplary embodiments are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 is a side view of a vehicle seat according to the present disclosure:

FIG. 2 is a fragmentary cross-sectional view of the vehicle seat taken along line 2-2 of FIG. 1 and showing a seat support structure, an airbag module attached to the support structure and a cover assembly attached to the support structure and covering the airbag module;

FIG. 8 is a front view of the front support of the cover assembly; and

DETAILED DESCRIPTION

Figure 3:
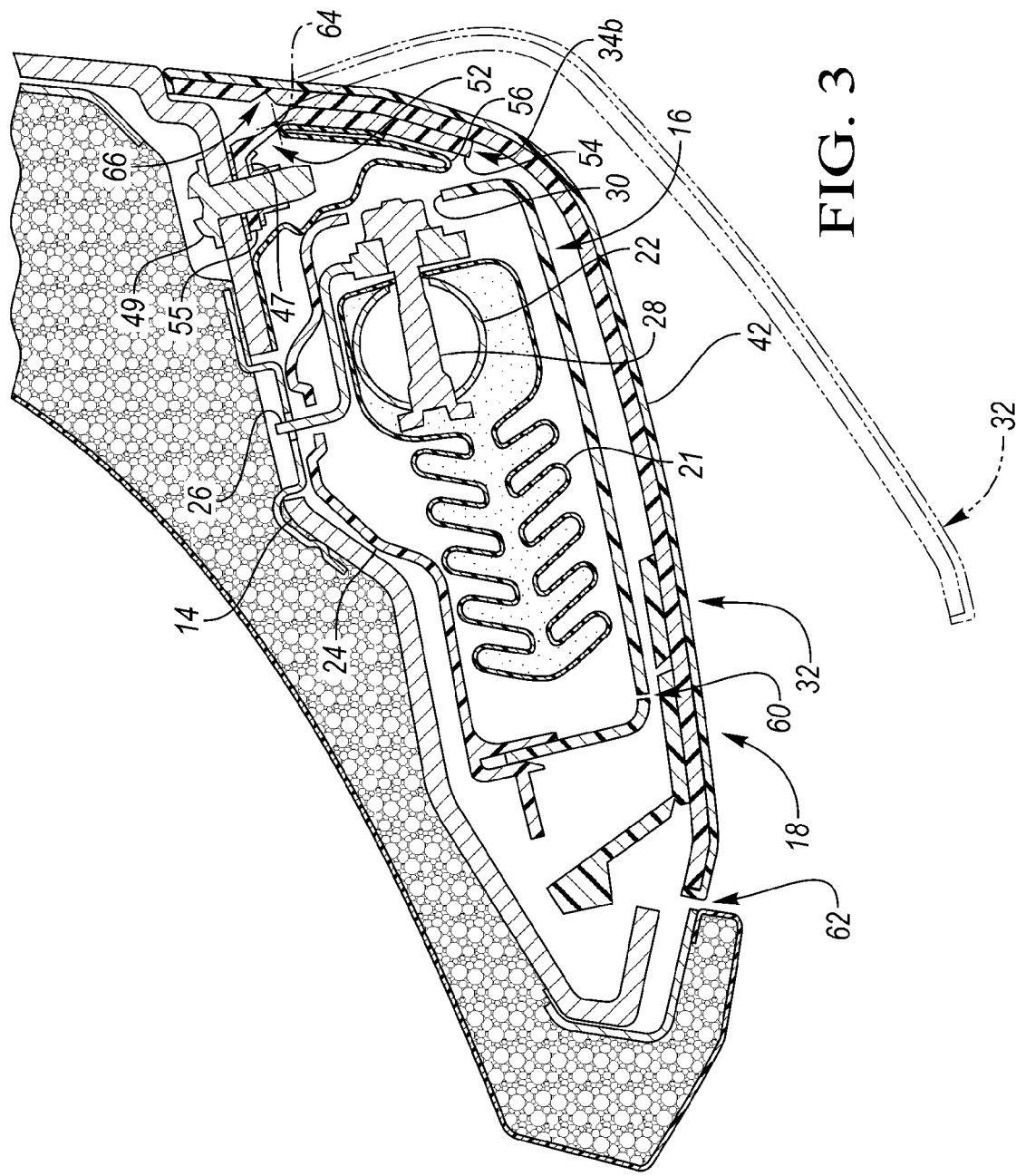
FIG. 3 is another fragmentary cross-section view of the vehicle seat taken along line 3-3 of FIG. 1.

Embodiments of the present disclosure are described herein. It is to be understood, however, that the disclosed embodiments are merely examples and that other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to FIG. 1, a vehicle seat 10 according to the present disclosure is shown mounted in a vehicle 12 (e.g., mounted to a floor 13 of the vehicle). The seat 10 includes a support structure 14, an airbag module 16 attached to the support structure 14, and a cover assembly 18 positioned over the airbag module 16 and attached to the support structure 14.

The support structure 14 may be any suitable support structure, such as a metal or plastic frame. In the embodiment shown in FIG. 1, the support structure 14 is formed as a carbon fiber seat structure, such as a carbon fiber shell, that supports other components of the seat 10 and provides rigidity to the seat 10. Furthermore, in the illustrated embodiment, the support structure 14 defines a bottom, visible portion of a seat bottom 19 of the seat 10, and a rear, visible portion of a seat back or backrest 20 of the seat 10. In addition, the support structure 14 may be formed as a single piece, or multiple pieces that are attached together. For example, the support structure 14 may include a first portion associated with the seat bottom 19, and a second portion associated with the backrest 20 and pivotally connected with the first portion.

The airbag module 16 may have any suitable configuration and may include any suitable components. Referring to FIGS. 2 and 3, for example, the airbag module 16 may include an inflatable or deployable airbag 21, an inflator 22 connected to, or otherwise associated with, the airbag 21, and a cover 24, such as a molded plastic housing (e.g., "hard cover"), covering the airbag 21 and inflator 22. In another embodiment, the airbag module 16 may include a soft fabric cover.

Figure 4:
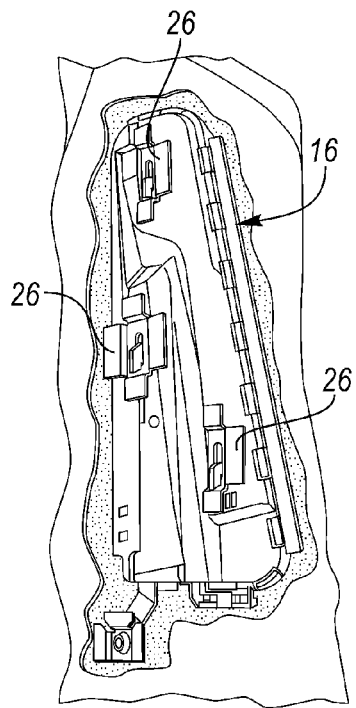
FIG. 4 is a side perspective view of the airbag module and multiple attachment brackets attached to the airbag module for attaching the airbag module to the support structure.

In addition, the airbag module 16 may be attached to the support structure 14 in any suitable manner. Referring to FIGS. 3 and 4, for example, the inflator 22 and/or cover 24 may be attached to one or more attachment brackets or bracket assemblies 26 with one or more fasteners 28 (e.g., bolts or screws), and the bracket assemblies 26 may likewise be attached to the support structure 14 in any suitable manner, such as with one or more fasteners and/or adhesive. In the embodiment shown in FIG. 3, the cover 24 has one or more openings 30 for providing access to the one or more fasteners 28. Furthermore, one or more of the bracket assemblies 26 may include a first portion attached to the support structure 14, and a second portion that is attached to the airbag module 16 and the first portion. For example, the second portion may be formed as a hook member that is engageable with the first portion.

Figure 5:
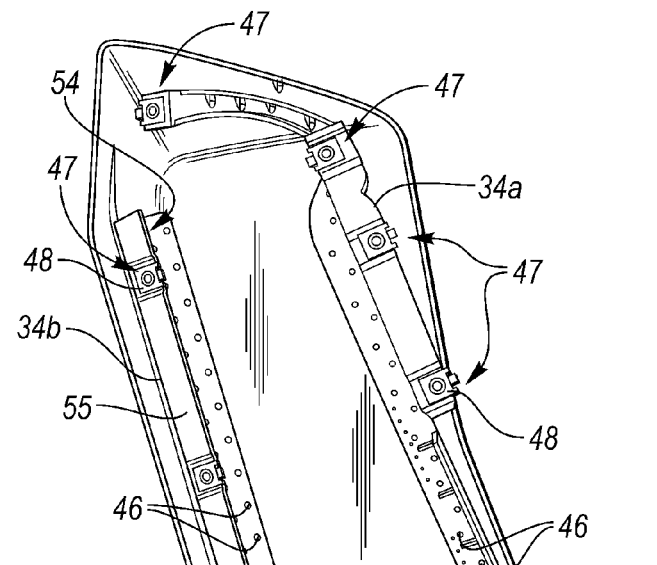
FIG. 5 is an interior view of the cover assembly, which includes a cover portion and multiple supports attached to the cover portion, wherein the supports include a front support and a rear support.

Referring to FIGS. 2, 3 and 5, the cover assembly 18 includes a cover or cover portion 32 that covers the airbag module 16, and one or more separately formed supports 34 attached to the cover portion 32 and configured to attach the cover portion 32 to the support structure 14. In the embodiment shown in FIG. 5, the cover assembly 18 includes first and second supports 34, such as front and rear supports or links 34a and 34b, respectively. Furthermore, in one embodiment, the cover portion 32 and the supports 34 are made of different materials. With such a design, the cover portion 32 and the supports 34 may have different characteristics, as explained below in detail, and those characteristics may be optimized based on material selections.

Figure 6:
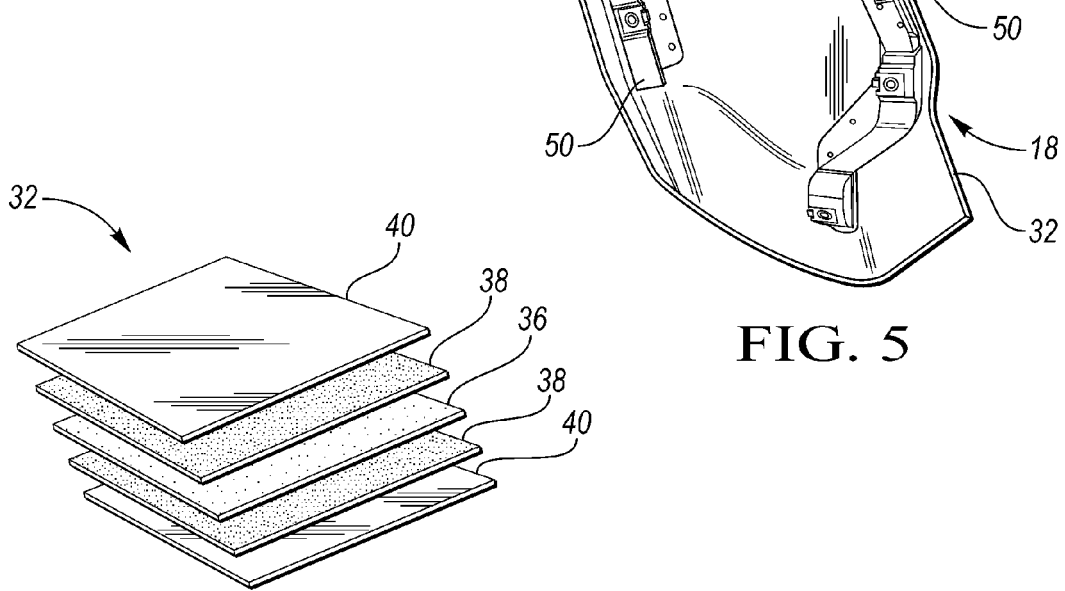
FIG. 6 is a schematic view of an example, multi-layered construction of the cover portion.

While the cover portion 32 may be made of any suitable material and in any suitable manner, in one embodiment, the cover portion 32 has a composite structure or configuration including multiple sheets or layers that are thermoformed to achieve a desired shape. For example, referring to FIG. 6, the cover portion 32 may include one or more plastic layers, such as polyethylene layers 36, one or more resin layers 38 and/or one or more reinforcement layers 40 (e.g., fiberglass or carbon fiber reinforced layers). As a more specific example, the cover portion 32 may include a polyethylene layer 36 sandwiched between two reinforcement layers 40, with a resin layer 38 disposed between each reinforcement layer 40 and the polyethylene layer 36. Furthermore, referring to FIG. 3, the cover portion 32 may also be provided with a surface layer 42, such as a fabric layer, that is bonded to the other layers to provide a desired appearance.

The above composite structure for the cover portion 32 may provide several benefits. For example, with such a configuration, the cover portion 32 may be relatively lightweight, while still exhibiting relatively high strength and stiffness compared to injection molded plastic. Furthermore, such a composite structure may maintain the above properties over a large temperature range.

In another embodiment, the cover portion 32 may be made of any suitable plastic material. For example, the cover portion 32 may be made of injection molded polypropylene.

Figure 7:
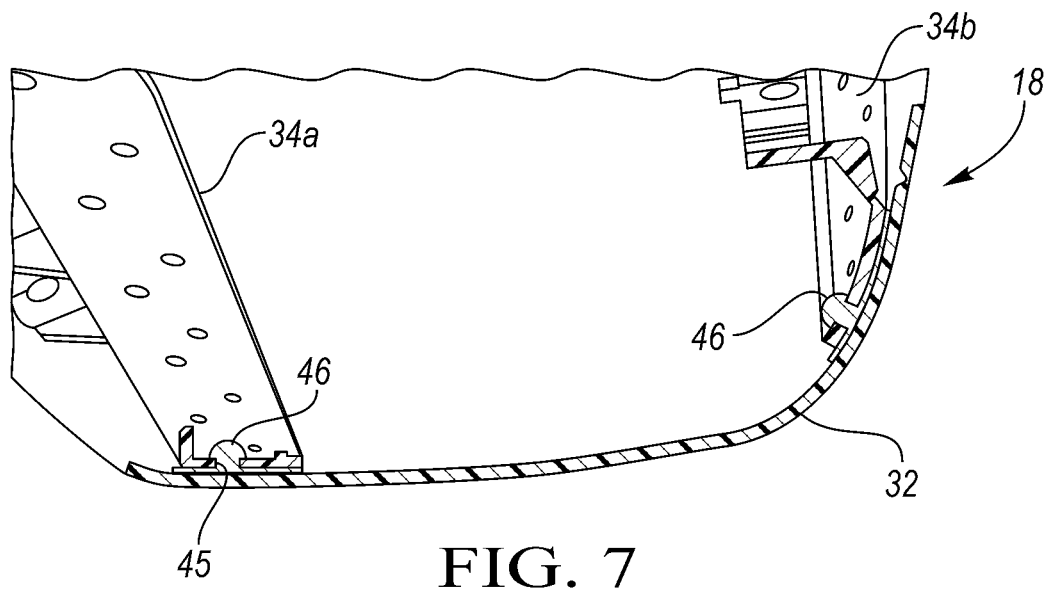
FIG. 7 is a fragmentary cross sectional view of a portion of the cover assembly.

The supports 34a and 34b may be attached to the cover portion 32 in any suitable manner, such as with one or more fasteners. In one embodiment, each support 34a and 34b is attached to the cover portion 32 with an adhesive, such as a hot melt adhesive. Furthermore, referring to FIGS. 5 and 7, each support 34a and 34b may have multiple holes or openings 45 for allowing adhesive material to pass through the support 34a, 34b. With such a configuration, the adhesive may form beads 46 on an outer surface of each support 34a and 34b, and the adhesive beads 46 may function like rivets to provide an additional attachment feature. The openings 45 may also inhibit bubbling of the adhesive, so that the supports 34a and 34b may remain tight against the cover portion 32.

Likewise, the supports 34a and 34b may be attached to the support structure 14 in any suitable manner. For example, referring to FIGS. 2, 3 and 5, each support 34a and 34b may be configured to receive one or more fasteners, such as screws, for attaching the cover portion 32 to the support structure 14 at select, spaced apart connection locations 47. As a more specific example, each support 34a and 34b may have one or more openings and/or one or more fasteners 48 (e.g., plastic or metal nuts) that are each configured to receive a complimentary fastener 49 (e.g., plastic or metal bolt). The fasteners 48 may be inserted into main body portions 50 of the supports 34a and 34b, or be co-molded (e.g., insert molded) with the main body portions 50.

In addition, the supports 34a and 34b may be made of any suitable material and in any suitable manner. For example, the main body portions 50 of the supports 34a and 34b may be made of molded (e.g., compression or injection molded) plastic, such as polypropylene or other polyolefin, or an elastomer or elastomeric material, such as natural or synthetic rubber. In one embodiment, the main body portions 50 of the supports 34a and 34b are made of injection molded ethylene propylene diene monomer (EPDM). With such a material and manufacturing process, relatively complex shapes or configurations of the supports 34a and 34b may be achieved. Furthermore, characteristics of the supports 34a and 34b, such as flexibility, may be optimized.

The supports 34a and 34b are configured to facilitate movement of the cover portion 32 with respect to the support structure 14 during deployment of the airbag 21. Referring to FIG. 2, for example, the front support 34a may have one or more rupturable or frangible areas 51 (e.g., reduced thickness sections or portions) that are configured to rupture during airbag deployment, and the rear support 34b may define or otherwise include a rear hinge 52 (e.g., a living hinge) that is configured to allow a front section of the cover portion 32 to move outwardly (e.g., pivot) during airbag deployment after the front support 34a has ruptured.

Referring to FIGS. 2, 5 and 8, the front support 34a may include two frangible areas 51 for each connection location 47, for example. As a more specific example, for each connection location 47 (e.g., at or otherwise proximate to each connection location 47), the main body portion 50 of the front support 34a may include two laterally extending sections 53 (e.g., one section 53 located above a respective fastener 48, and one section 53 located below the fastener 48) that are each disposed between the cover portion 32 and the support structure 14, and that each include a frangible area 51. Furthermore, each section 53 may join a portion of the front support 34a that is connected to the support structure 14 with a portion of the front support 34a that is connected to the cover portion 32.

In one embodiment, each laterally extending section 53 may have a thickness in the range of 1 to 3 mm (e.g., 2 mm), and each frangible area 51 may have a thickness in the range of 0.2 to 0.4 mm (e.g., 0.3 mm). With such a configuration, the front support 34a may provide controlled separation of the cover portion 32 from the support structure 14 during deployment of the airbag 21.

Referring to FIGS. 2, 3 and 5, the hinge 52 of the rear support 34b may be located between two elongated sections 54 and 55 of the rear support 34b. In one embodiment, the hinge 52 is formed as a flexible, reduced thickness section of the rear support 34b. Furthermore, the hinge 52 is formed integrally with the elongated sections 54 and 55, and the hinge 52 connects the elongated sections 54 and 55 together.

Figure 9:
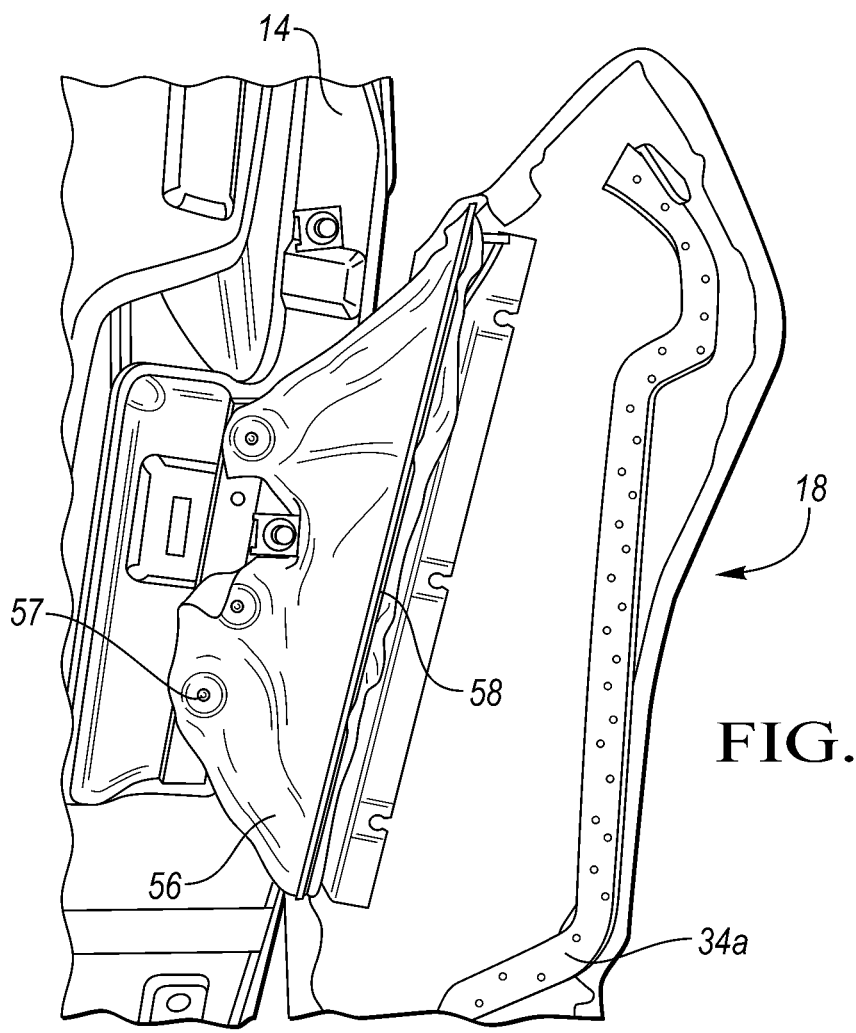
FIG. 9 is a perspective view of the cover assembly separated from the support structure, but still attached to the support structure with a tether.

Referring to FIGS. 3 and 9, the seat 10 may further include a tether or strap 56 connected to the cover portion 32 and the support structure 14. The strap 56 may function to maintain a connection between the cover portion 32 and the support structure 14 during airbag deployment if, for example, the cover portion 32 becomes completely disconnected from the support structure 14 at the supports 34a and 34b (e.g., both supports 34a and 34b rupture or break such that the cover portion 32 separates from the support structure 14), as shown in FIG. 9.

The strap 56 may be made of any suitable material and may be connected to the cover potion 32 and support structure 14 in any suitable manner. For example, the strap 56 may be made of one or more layers of a high strength, flexible fabric, such as a fabric made of nylon or other polyamide, and the strap 56 may be connected to the cover portion 32 and support structure 14 with suitable fasteners. In the embodiment shown in FIG. 9, the strap 56 is connected to the cover portion 32 and support structure 14 with rivets 57. The cover assembly 18 may also include a reinforcement member, such as a metal plate 58, on an inner surface of the cover portion 32 for receiving the rivets 57.

Referring to FIG. 3, during deployment of the airbag 21, portions of the airbag module cover 24 are configured to separate at a deployment location or split line 60 to allow the airbag 21 to extend out of the cover 24. Furthermore, the front support 34a is configured to rupture at the frangible areas 51 to allow the front section of the cover portion 32 to separate from the support structure 14 at a deployment location 62. As a result, the airbag 21 may deploy between the cover portion 32 (shown in phantom lines in the pivoted position) and the support structure 14. The rear hinge 52 of the rear support 34b may also facilitate movement of the cover portion 32 with respect to the support structure 14 by allowing the cover portion 32 to pivot with respect to the support structure 14 about a generally upright or vertical axis 64. As shown in FIG. 3, the cover portion 32 may also have a notch, groove or other indentation 66 that is configured to facilitate movement (e.g., pivotal movement about axis 64) of the cover portion 32 with respect to the support structure 14.

During airbag deployment, the rear support 34b may initially allow the cover portion 32 to pivot as described above, and then the rear support 34b may rupture, such as at the rear hinge 52 (e.g., the hinge 52 may function as a frangible area), so that the entire cover portion 32 moves away from the support structure 14. In that case, referring to FIG. 9, the tether 56 may maintain a connection between the cover portion 32 and the support structure 14, as described above in detail.

While the airbag 21 may have any suitable size and shape, in one embodiment, the airbag 21 may be configured as a head/thorax airbag that is large enough to protect a head and thorax of a seat occupant. Likewise, referring to FIG. 1, the cover portion 32 of the cover assembly 18 may also be configured to extend between a headrest portion 68 and the seat bottom 19 of the vehicle seat 10 so as to completely cover the airbag module 16. In one embodiment, the cover portion 32 may have a length in the range of 0.4 to 0.5 meters, and a width in the range of 0.15 to 0.20 meters.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat comprising:
    a support structure;
    an airbag module attached to the support structure and including a deployable airbag; and
    a cover assembly positioned over the airbag module and attached to the support structure, the cover assembly including a cover portion that covers the airbag module, and a support made separately from the cover portion and being attached to the cover portion and the support structure, the support defining a hinge configured to facilitate movement of the cover portion with respect to the support structure during deployment of the airbag, wherein the hinge is disposed rearward of the airbag module and adjacent the support structure.

2. The vehicle seat of claim 1 wherein the cover portion and the support are made of different materials.

3. The vehicle seat of claim 2 wherein the support includes a main body portion made of an elastomer.

4. The vehicle seat of claim 3 wherein the main body portion is made of ethylene propylene diene monomer.

5. The vehicle seat of claim 1 further comprising an additional support attached to the cover portion and the support structure and that extends in front of the airbag module, the additional support including a frangible area that is configured to rupture during deployment of the airbag to allow the cover portion to move with respect to the support structure.

6. The vehicle seat of claim 5 wherein the support is positioned at a rear area of the cover portion, and the additional support is positioned at a front area of the cover portion.

7. The vehicle seat of claim 6 wherein each of the supports comprises an elastomeric material.

8. The vehicle seat of claim 5 wherein the additional support is attached to the support structure at multiple, spaced apart connection locations, and the additional support includes two frangible portions for each connection location, and wherein the frangible portions are configured to rupture during deployment of the airbag to allow the cover portion to move with respect to the support structure.

9. The vehicle seat of claim 8 wherein the additional support includes a main body portion and a fastener attached to the main body portion at each connection location, and wherein, proximate each connection location, the main body portion includes two laterally extending sections that each extend between the cover portion and the support structure, and that each include one of the frangible portions.

10. The vehicle seat of claim 9 wherein the main body portion of the support is made of an elastomeric material.

11. The vehicle seat of claim 1 wherein the support is adhesively bonded to the cover portion.

12. The vehicle seat of claim 1 wherein the cover portion comprises a composite structure including at least one layer of polyethylene material and at least one reinforcement layer.

13. The vehicle seat of claim 1 further comprising a tether connected to the cover portion and the support structure, the tether being configured to maintain a connection between the cover portion and the support structure during deployment of the airbag.

14. The vehicle seat of claim 1 wherein the cover portion is a thermoformed composite structure, and the support includes an injection molded main body made of an elastomeric material.

15. The vehicle seat of claim 1 wherein the support includes a forwardly extending first section attached to the support structure on an outboard side of the support structure and an inboard side of the airbag module, and a second section attached to the cover portion and extending rearwardly of the airbag module, and wherein the hinge is disposed between the first and second sections.

16. A vehicle seat comprising:
    a carbon fiber support structure;
    an airbag module attached to the support structure; and
    a cover assembly positioned over the airbag module and including a composite cover portion that covers the airbag module, and first and second elastomeric supports that are each attached to the cover portion and the support structure, the first elastomeric support including a frangible area that is configured to rupture during deployment of the airbag to allow the cover portion to move with respect to the support structure, and the second elastomeric support defining a hinge for facilitating movement of the cover portion with respect to the support structure during deployment of the airbag, wherein each elastomeric support comprises ethylene propylene diene monomer.

17. The vehicle seat of claim 16 wherein the hinge is disposed rearward of the airbag module and adjacent the support structure such that the airbag module does not extend between the hinge and the support structure.

18. The vehicle seat of claim 16 wherein the first elastomeric support is attached to the support structure on an outboard side of the support structure, and the second elastomeric support includes a forwardly extending first section attached to the support structure on the outboard side of the support structure and an inboard side of the airbag module, and a second section attached to the cover portion and extending rearwardly of the airbag module, and wherein the hinge is disposed between the first and second sections.

19. The vehicle seat of claim 16 wherein the first elastomeric support is attached to the support structure at multiple, spaced apart connection locations, and the first elastomeric support includes two frangible portions for each connection location, and wherein the frangible portions are configured to rupture during deployment of the airbag to allow the cover portion to move with respect to the support structure.

20. A vehicle seat comprising:
   a support structure;
   an airbag module attached to the support structure and including a deployable airbag; and
   a cover assembly positioned over the airbag module and attached to the support structure, the cover assembly including a cover portion that covers the airbag module, and a support made separately from the cover portion and being attached to the cover portion and the support structure, the support being configured to facilitate movement of the cover portion with respect to the support structure during deployment of the airbag;
   wherein the support is attached to the support structure at multiple, spaced apart connection locations, and the support includes two frangible portions for each connection location, and wherein the frangible portions are configured to rupture during deployment of the airbag to allow the cover portion to move with respect to the support structure.

* * * * *